July 16, 1940.　　　　A. F. GREINER　　　　2,207,981
UNIVERSAL JOINT
Filed Aug. 1, 1938
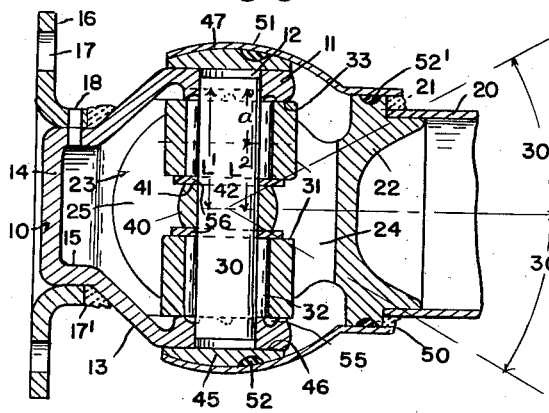
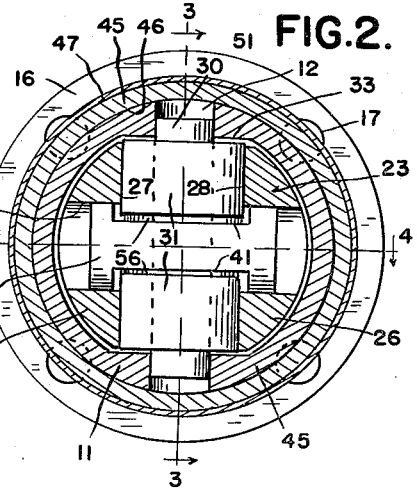
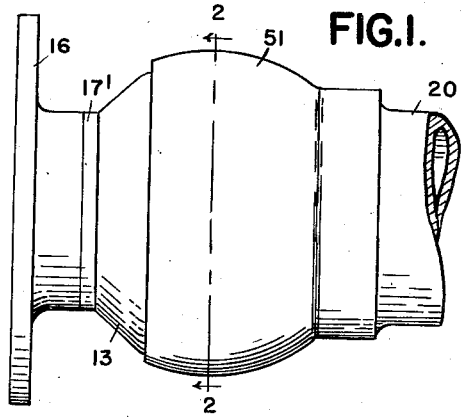
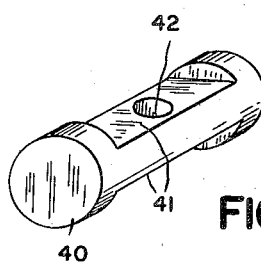
INVENTOR
ANTON F. GREINER
BY
Whittemore, Hulbert & Belknap
ATTORNEYS Patented July 16, 1940

2,207,981

UNITED STATES PATENT OFFICE 2,207,981

UNIVERSAL JOINT

Anton F. Greiner, Detroit, Mich.

Application August 1, 1938, Serial No. 222,472

6 Claims. (Cl. 64—7)

The present invention relates to a universal joint and more specifically to a torque transmitting universal joint of simplified design.

It is an object of the present invention to provide a universal joint which will operate efficiently and which is characterized by the extreme simplicity of its construction.

It is a further object of the present invention to provide a universal joint characterized by a single driving pin interconnecting the driving and driven means.

It is a further object of the present invention to provide a universal joint in which no spherical surfaces are required.

It is a further object of the present invention to provide a universal joint which comprises essentially a cup shape member in combination with a slotted shaft end in which the driving connection takes the form of a pin spanning the cup member and received within the slotted shaft end.

It is a further object of the present invention to provide a torque transmitting universal joint in which a single pin constitutes the driving connection, permitting the employment of a single pair of bearings therein.

Other objects of the invention will be apparent as the description proceeds and when taken in conjunction with the accompanying drawing, and wherein Fig. 1 is a side elevation of my improved joint;

Fig. 2 is a transverse section on the line 2—2, Fig. 1;

Fig. 3 is a longitudinal section on the line 3—3, Fig. 2;

Fig. 4 is a transverse section on the line 4—4, Fig. 2; and

Fig. 5 is a perspective of the king pin employed in my universal joint.

For purposes of illustration I have shown in Figures 1 to 4 a preferred embodiment of my present invention. It will be understood that this embodiment is illustrative only and is to be regarded in no sense as limiting.

In the present embodiment a cup member generally indicated at 10 is provided comprising a cylindrical edge portion 11 provided with diametrically opposed apertures 12. Connected at the inner end to the cylindrical portion 11 is a frusto-conical portion 13 which terminates in an integrally formed shallow cup 14 provided with a short cylindrical portion 15 which blends into the smooth surface of the frusto-conical portion 13. An attaching flange 16 which is provided with suitable bolt holes or other attaching means, indicated at 17, is formed as shown in Fig. 3 to conform generally to the shallow cup portion 14. Preferably the flange portion 16 is separately formed in the interest of economy and is welded or otherwise secured to the cup member 10 as indicated at 17'. I have indicated at 18 a passage through which the interior of the assembled bearing may be charged with lubricating material and subsequently permanently sealed.

It may be pointed out at the present time that the universal joint disclosed is of the type which when assembled is permanently sealed and need not thereafter be disassembled. For this purpose it is desirable to charge the interior of the joint with lubricating material and provisions subsequently to be described are made for insuring adequate lubrication at the necessary points.

It will be understood that the cup member generally indicated at 10 is adapted to be secured to a driving shaft, or the like. It is within the contemplation of the present invention that the member 10 shall be either a driving or a driven member as will be obvious, but in its preferred form the cup member 10 is secured through the medium of the flange 16 to the driving member. A shaft 20 therefore in the present described embodiment will be the driven member and is shown as connected by welding 21, or the equivalent thereof, to a shaft end member 22.

This member 22 terminates in a generally forked portion 23 having two spaced ears 25 and 26, and an intermediate slot 24, best seen in Fig. 4. These ears are adapted to serve as torque transmitting members and receive the thrust of the roller pin 30 through the rollers 31. For this purpose the ears 25 and 26 are provided at their opposed surfaces with flat parallel driving surfaces 27 and 28. The surfaces 27 and 28, for a purpose subsequently to be described, are spaced apart a distance substantially equal to the diameter of the rollers 31. The relationship is such that when the rollers 31 engage the surface 27 or 28, there is a very slight clearance between the roller and the opposite surface. In addition ears 25 and 26 are provided with smooth cylindrical bearing apertures 29 for a purpose subsequently to be described. These apertures 29, however, are located so that their axis passes through the geometrical axis of the member and when the device is assembled the axis passes also through the center of rotation.

In order to transmit torque from the cup member 10 to the shaft end 22, I provide a pin 30 which I designate herein as a roller pin. This pin is adapted to be received within the diametrically opposed apertures 12 and is journaled therein for free rotation. In the assembled universal joint the roller pin 30 is received within the slot 24 and rotation of the cup member 10 is adapted to transmit the torque through the roller pin to the shaft end member 22.

In order that this torque may be most efficiently transmitted without undue wear to the bearing surfaces, I prefer to surround the roller pin 30 with a pair of rollers 31 and to provide intermediate the rollers and the shaft 30 a plurality of needle bearings 32. Preferably the cylindrical portion 11 of the cup member 10 is provided adjacent the apertures 12 with flat surfaces 33 against which the rollers 31 are adapted to rotate and which flat surfaces serve to retain the needle bearings 32 against displacement.

The rollers 31 are of a size to be freely received within the slot 24 between the opposed flat plane surfaces 27 and 28. As will be readily appreciated, during operating conditions when the pin 30 is serving to transmit torque from the cup member 10 to the shaft end 22, the rollers 31 will be forced in driving relation against the surfaces 27 and 28.

Referring now specifically to Fig. 2, if the direction of rotation of the cup member is clockwise the upper roller 31 is forced against ear 26 so that motion between the roller and the surface 28, due to inclination of the axes of the cup member and of the shaft end, causes rotation of the roller 31. The roller at the non-driving side has a slight clearance with respect to the plane surface 27. It will be readily understood that the opposite conditions prevail with respect to the lower roller 31 shown in Fig. 2; that is, the lower roller has a slight clearance with respect to the surface 28, and is in driving relation with surface 27.

In order to retain the cup member 10 connected to shaft end 22, I provide a second pin 40 which I designate as a king pin. The king pin 40 is rotatively received within the opposed bearing apertures 29 provided in the ears 25 and 26. As best seen in Fig. 5, this king pin is in the form of a cylinder provided intermediate its end with two flattened portions 41. An aperture 42 is provided piercing the pin and opening centrally in the flat portions 41. Preferably the aperture 42 is of a size to receive the roller pin 30 rotatably but snugly.

In assembling the device, washers 56 are provided intermediate the king pin 40 and the rollers 31. These bearings in addition to their bearing function serve also as retainers for retaining needle bearings 32 within roller member 31.

A retainer ring 45 is provided which has a cylindrical inner surface 46 adapted to conform to the exterior surface of the cylindrical portion 11 of the cup member. Ring 45 has its exterior surface 47 formed as a portion of a sphere. This ring may be slipped over the cup member 10 as indicated in Fig. 2 and will serve as an additional retaining means for the roller pin 30. The shaft end member 22 has an annular flange 50 on which is slidably supported shell 51 which may be of any suitable material but which is preferably of a relatively light gauge sheet metal. The shell 51 is formed spherically to conform to the surface 47.

The shell 51 is adapted to seal the interior of the universal joint and for this purpose, if desired, a suitable sealing gasket indicated at 52 may be employed. This may take the form of a ring of suitable material, or the sealing engagement between the shell 51 and the ring 45 may be formed in any well known manner as desired. A similar gasket 52' seals the engagement between flange 50 and shell 51.

The flat portion 33 of the cup member 10 is preferably provided with lubricating grooves 55 indicated in Fig. 3. During the operation of my improved universal joint, due to centrifugal action, and the conical or inclined shape of cup portion 13, lubricant will be forced radially of the cup member 10 and will thence be forced into grooves 55 and from there into the space between the rollers 31 and the rollershaft 30, thus effectively lubricating the roller bearings 32. By this means a constant supply of lubricating material is provided for the bearings and in addition the lubricating material will be effectively circulated therepast to provide a constant supply of fresh lubricating material. This also has the additional effect of substantially cooling the bearings, due to the effective circulation of lubricant.

It should be noted at this time that my improved universal joint is notable for its extreme simplicity, comprising as it does only six essential elements; namely, the cup member 10, the shaft end 22, the roller pin 30, the rollers 31, the king pin 40 and the retainer ring 45. These parts may be manufactured in quantities very economically since there are no spherical bearing surfaces to be accurately machined. It should be noted that the retainer ring 45 does not have a load bearing surface, the spherical external surface 47 thereof having merely sealing engagement with the shell 51 so that the surface 47 need not be accurately finished. This is particularly true where, if preferred, suitable additional sealing means, such as 52, are provided.

In assembling my improved universal joint, the shaft end 22 is positioned within the cup 10 with the slot 24 properly aligned with apertures 12 and with the king pin 40 in the apertures 29. The king pin 40 is positioned so that its central aperture 42 is also aligned with apertures 12. The roller pin 30 is now inserted, and as it is inserted is passed through the rollers 31 and needle bearings 32, the washers 56 also being positioned over the pin in an appropriate position. As previously stated, the pin 30 fits into the aperture 42 and it is centered therein.

The shell 51 is separately spun into snug engagement with ring 45. The shell and ring may be slipped as a unit over cup 10, and in order to retain them in assembled position, a screw or the like may secure the ring to the cup. For this purpose the screw hole in the ring may be countersunk so that the smooth exterior surface 47 will not be interrupted by a projection, and the shell 51 may be smoothly slidable thereover.

At this time the interior of the universal joint is charged through the aperture 18 with a suitable lubricant, after which the aperture 18 is permanently sealed.

It should be particularly noted that my improved universal joint has a highly efficient torque transmitting relation. The torque is transmitted from the cup 10 to the extreme ends of the roller pin 30 and from the roller pin 30 through the bearings or rollers 31 to areas adjacent the edge of surfaces 27 and 28.

It should be noted that the king pin 40 does not receive the torque and serves merely as a means for retaining the parts in assembled relation. This is an important feature of my invention, since the effective lever arm of the driving member 10 is indicated by L—1 and the effective lever arm of the driven member, that is, the shaft end 22, is indicated by L—2. These lever arms are measured from the point of rotation to the center of the thrust bearing, the arm L—2 terminating centrally of the roller bearing 31. These lever arms, as will be noted in Fig. 3, are relatively long and serve to transmit the torque efficiently without increasing the size of the elements to an undesirable degree.

In addition it should be noted that the bending moment of the roller pin 30 is measured by the difference between arms L—I and L—2, indicated in Fig. 3 by the letter a. In other words, the roller pin 30 is not subjected to an excessive bending moment as it is in the common type of universal joint where the torque is transmitted through a transverse member by applying the torque to the ends thereof and transmitting the torque from substantially the center thereof. This results in extreme efficiency, long wear and, due to the roller 31, quiet operation of my improved universal joint.

It is desired to point out at this time that due to the novel design of my improved universal joint the geometric center of the joint is under all conditions and at any permissible angularity of the axes the center of rotation. Therefore, this joint may be constructed of relatively light weight material and still may be employed for transmitting high torques.

Due also to the novel construction of my universal joint and particularly to the employment of a roller pin 30, together with rollers 31, which rotate or revolve about two axes, the motion of the rollers is under accurate control by the use of the king pin 40. The king pin 40 serves to retain the geometric center of the roller pin 30 and its associated elements at the center of rotation.

From an inspection of Figs. 3 and 4, it may be seen that my improved universal joint may operate efficiently at relatively high angles, the embodiment illustrated being adapted for a total deflection of substantially 60°, that is, 30° to either side of the normal or parallel axes condition. It is properly classified, therefore, as a so-called "wide angle" joint.

Attention is particularly directed to the fact that the torque is transmitted through the middle of the roller pin 30 and the roller 31 directly from the periphery of the cup member 10 to a point adjacent to the periphery or widely displaced from the axes of the shaft end member 22.

The foregoing detailed description has been given for clearness and understanding only, and no unnecessary limitation should be understood therefrom, but the appended claims should be construed as broadly as permissible in view of the prior art.

What I claim as my invention is:

1. A universal joint comprising a bifurcated member having a centrally apertured pin spanning the legs of said member, a cup having a transverse pin received between said legs and passing through the aperture in said first pin, said cup at its edge having a cylindrical exterior surface, a ring conforming to said surface and spherically shaped externally, and a spherically shaped shell carried by said bifurcated member and slidably engaging said ring.

2. A universal joint comprising a cup member provided with a cylindrical lip having diametrically disposed apertures therethrough; a bifurcated member having an open ended slot, and a centrally apertured pin spanning said slot, said bifurcated member and pin being freely withdrawable from said cup member with the apertures in said cup aligned with the aperture in said pin; a driving pin insertable through an aperture in said cup, and adapted to be received in said slot and in the aperture in said first pin; an annular member fitting over said lip and having a spherical outer surface; and a spherically formed shell carried by said bifurcated member and fitting over said annular member.

3. A universal joint comprising a bifurcated member having ears provided with flat opposed parallel surfaces, said ears having aligned circular apertures, a king pin having circular ends receivable in said apertures and having a flat, centrally apertured middle portion, a cup having a lip provided with diametrically disposed apertures, a driving pin received at its ends in the apertures in said lip and centrally received in the aperture in said pin, rollers around said driving pin between said surfaces, bearings between said rollers and said pin, and bearing retainers abutting the flat middle portion of said king pin and closing the ends of said rollers.

4. In a universal joint having a cup provided with a cylindrical lip portion having diametrically opposed apertures therethrough, a member having laterally spaced portions forming substantially parallel opposed wall surfaces and extending into said cup, a torque transmitting pin extending between the opposed wall surfaces and having the opposite ends projecting into said openings, an annular member sleeved on the cylindrical lip in overlapping relation to the apertures and having a spherically-shaped outer surface, and a spherically formed sealing shell carried by the first named member and fitting over the spherical surface of said annular member.

5. A universal joint comprising a cup member having diametrically opposed apertures, a member having laterally spaced portions forming opposed substantially parallel wall surfaces and extending into the cup, a kingpin spanning the laterally spaced wall portions of said member and having the opposite ends rotatably mounted in apertures respectively formed in the laterally spaced portions, a second pin received at its ends in the apertures formed in the cup member and having an intermediate portion received in an aperture formed in the central portion of the kingpin, bearings mounted on the second named pin at opposite sides of the kingpin, said bearings being held in spaced relation to each other by the kingpin and having a rolling engagement with the opposed substantially parallel surfaces aforesaid.

6. A universal joint comprising a cup member having diametrically opposed apertures, a member having laterally spaced portions forming opposed substantially parallel wall surfaces and extending into said cup, a kingpin spanning the laterally spaced portions and having the opposite ends respectively rotatably mounted in apertures respectively formed in said laterally spaced portions, said kingpin having a flat central portion of less width than the diameter of the kingpin and having an opening through the flat portion, a pin received at its ends in the apertures in said cup member and having an intermediate portion extending through the aperture in said kingpin, bearings mounted on the second named pin at opposite sides of the flat portion of the kingpin, said bearings being held in spaced relation to each other by the flat portion of the kingpin and having a rolling engagement with the opposed parallel surfaces aforesaid.

ANTON F. GREINER.